United States Patent
Fernandez-Mateo

(10) Patent No.: US 8,347,995 B2
(45) Date of Patent: Jan. 8, 2013

(54) AUTOMOBILE PROVIDED WITH A POWER SUPPLY BATTERY WHICH IS REMOVABLE BY A VERTICAL MOVEMENT, AND DEVICE FOR INSTALLING AND REMOVING SUCH A BATTERY

(75) Inventor: Jose Fernandez-Mateo, Rambouillet (FR)

(73) Assignee: Renault S.A.S., Boulogne-Billancourt (FR)

( * ) Notice: Subject to any disclaimer, the term of this patent is extended or adjusted under 35 U.S.C. 154(b) by 0 days.

(21) Appl. No.: 13/142,715

(22) PCT Filed: Dec. 10, 2009

(86) PCT No.: PCT/FR2009/052484
§ 371 (c)(1),
(2), (4) Date: Oct. 17, 2011

(87) PCT Pub. No.: WO2010/076457
PCT Pub. Date: Jul. 8, 2010

(65) Prior Publication Data
US 2012/0037437 A1  Feb. 16, 2012

(30) Foreign Application Priority Data
Dec. 30, 2008  (FR) ..................... 08 07503

(51) Int. Cl.
*B60R 16/04* (2006.01)
(52) U.S. Cl. ................. 180/68.5; 180/69.1; 180/65.22
(58) Field of Classification Search ........... 180/68.5, 180/65.1, 65.22, 69.1, 69.4; 700/218, 230; 320/109, 113; 248/36.014
See application file for complete search history.

(56) References Cited

U.S. PATENT DOCUMENTS

| 4,087,895 A | 5/1978 | Etienne |
| 5,373,910 A | 12/1994 | Nixon |
| 5,542,488 A | 8/1996 | Nixon |
| 5,998,963 A * | 12/1999 | Aarseth ............... 320/109 |
| 2005/0274556 A1 | 12/2005 | Chaney |
| 2008/0006459 A1 | 1/2008 | Niebuhr |
| 2008/0294283 A1 * | 11/2008 | Ligrano ............... 700/218 |

FOREIGN PATENT DOCUMENTS

| EP | 1 876 075 | 1/2008 |
| FR | 2 197 353 | 3/1974 |
| FR | 2 354 897 | 1/1978 |
| JP | 2003 237456 | 8/2003 |

OTHER PUBLICATIONS

International Search Report issued Apr. 12, 2010 in PCT/FR09/052484 filed Dec. 10, 2009.

* cited by examiner

Primary Examiner — John Walters
Assistant Examiner — James Triggs
(74) Attorney, Agent, or Firm — Oblon, Spivak, McClelland, Maier & Neustadt, L.L.P.

(57) ABSTRACT

A motor vehicle including a structure including a bottom and which bears a motor powered by a removable power supply battery, the structure further including an element for receiving the battery and an attachment mechanism for attaching the battery onto the receiving element. The receiving element and the attachment mechanism are adapted to enable installation of the battery in the receiving element from the underside of the structure by an upward movement towards the structure, and removal of the battery under the structure by a downward movement in a direction opposite to the structure.

8 Claims, 1 Drawing Sheet

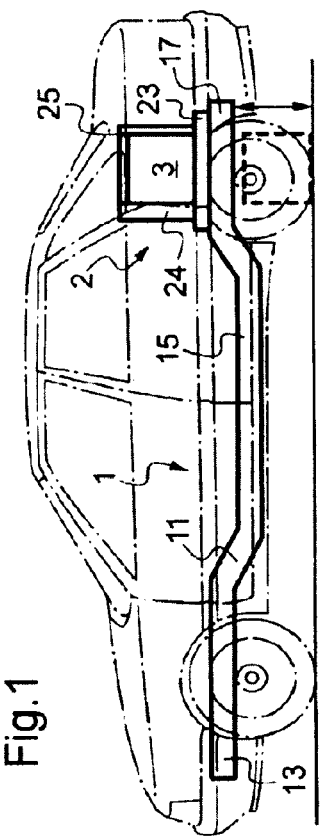
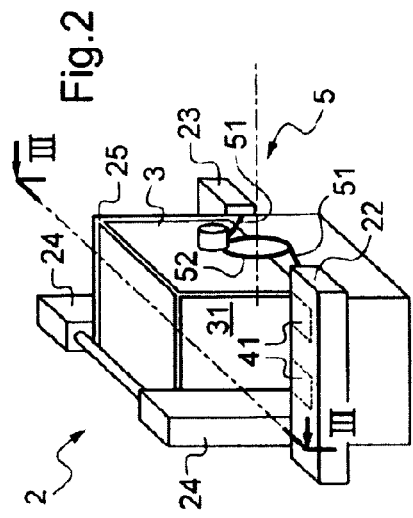
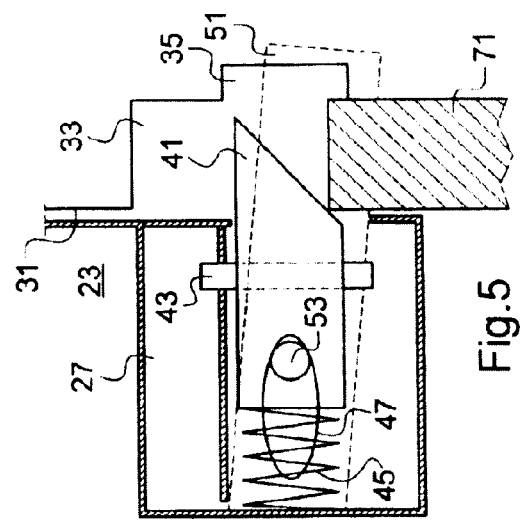
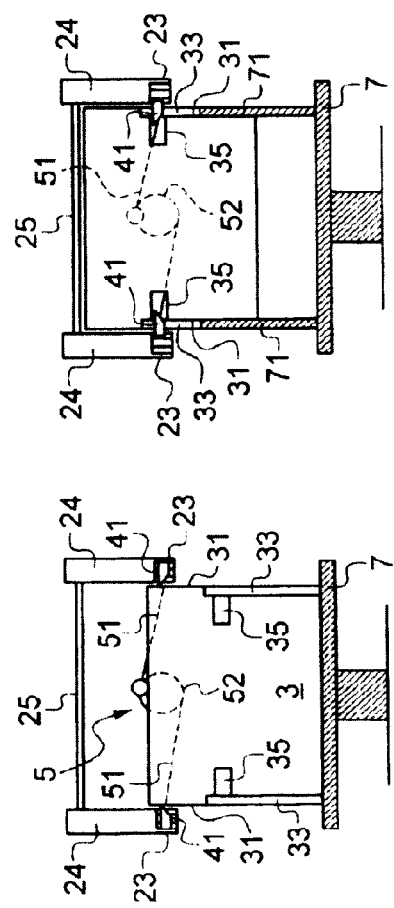

AUTOMOBILE PROVIDED WITH A POWER SUPPLY BATTERY WHICH IS REMOVABLE BY A VERTICAL MOVEMENT, AND DEVICE FOR INSTALLING AND REMOVING SUCH A BATTERY

BACKGROUND

The present invention relates to a motor vehicle whose motor is supplied continuously or in alternative manner by a battery that provides electric power. The present invention therefore relates to electric-motor vehicles and to hybrid-motor vehicles.

The document US 2005274556 A1 describes a motor vehicle whose motor may be supplied by a battery. This battery is fixed to the vehicle structure at a housing disposed underneath the passenger compartment, between the front and rear wheels of the vehicle. The battery may be installed in or removed from the structure by a horizontal sliding movement, in the manner of a drawer.

The document JP 2003237456 A1 describes a motor vehicle of the truck type, which has a structure that supports a driver's cab and which extends behind the cab. The motor of this vehicle may be supplied by a battery housed in a container. The container is fixed to the structure by way of a receiving element, integral with the structure and which contains a frame formed by elements that are longitudinal and transverse relative to the structure. The container is disposed on this frame, situated behind the cab. Installation of the container on the frame is achieved by a vertical downward movement. The container is maintained in suspension above the frame, or in other words above the structure, then lowered toward this structure in order to be deposited on the frame. Removal of the battery takes place in the following manner: the container has extensible feet, which may be braced on the ground, on each side of the vehicle. When the feet are extended, the container is raised above the structure, which makes it possible to disconnect it electrically from the structure. The structure is then displaced horizontally, beyond the underside of the container. The latter remains on its feet, above the ground.

This vertical installation and removal movement is practical, but may be employed only for a vehicle having a structure equipped with a receiving element accessible from above the vehicle. Since the battery may be extremely heavy, it is necessary to provide appropriate gear for its installation, its removal and subsequent handling.

BRIEF SUMMARY

One objective of the present invention is to propose a motor vehicle whose motor is capable of being supplied by an electric battery, which permits easy and quick installation and removal of this battery.

This objective is achieved by means of a motor vehicle provided with a structure that has an underside and that supports a motor supplied by a removable power supply battery, the structure being additionally provided with an element for receiving the battery and with means for fixing the battery on the receiving element, the battery being capable of being installed in or removed from the receiving element by a vertical movement.

According to the invention, the structure, the receiving element and the fixation means are conformed in such a way as to permit installation of the battery in the receiving element from the underside of the structure, by an upward movement in the direction of the structure, and removal of the battery underneath the structure by a downward movement in the direction away from the structure.

In this way, the battery may be disposed under the vehicle structure, at the passenger compartment, for example, without any need for access to the battery from above.

According to one embodiment, the battery contains a box having two opposite vertical surfaces, in each of which there is made at least one recess having an upper bracing surface, and the fixation means have at least two bolt-forming fingers, which have free ends and which are movable between an installation position, in which the free ends are spaced apart from one another or are able to be braced against the vertical surfaces of the box, and a fixation position, in which the free ends are close to one another and are able to be braced against the upper bracing surface of each of the recesses, so as to suspend the box between the fingers.

Advantageously, the vehicle is provided with means for interlocking the fixation means.

According to one embodiment, the interlocking means include a drive element, integral with one of the fingers, and an interlocking element, which pulls on the drive element to maintain the finger inserted in the recess.

Advantageously, the bolt-forming fingers are mounted on the receiving element via restoring means, which exert a restoring force on each of the fingers, which maintains the fingers in the fixation position.

According to one embodiment, the box is provided on each of the vertical surfaces with a substantially vertical guide groove that intersects the recess.

The present invention also relates to a device for installing and removing a removable battery on a receiving element with which the structure of a vehicle according to the invention is equipped. This device is provided with a horizontal platform capable of being disposed underneath the structure and with means for unblocking the fixation means, so that the fixation means can be moved from the fixation position to the installation position by a vertical upward displacement of the platform and/or of the unblocking means toward the structure, as a result of which the battery becomes detached from the structure and is braced on the platform.

According to a particular embodiment, the unblocking means include two vertical rods mounted on the platform.

BRIEF DESCRIPTION OF THE DRAWINGS

Other features and advantages of the invention will become apparent from reading the description hereinafter of a particular embodiment of the invention, provided by way of indication but not limitation, with reference to the attached drawings, wherein:

FIG. 1 shows a longitudinal section of a vehicle according to a particular embodiment of the present invention;

FIG. 2 shows a perspective side view of a particular embodiment of the receiving element, on which there is mounted a particular embodiment of the battery;

FIG. 3 shows a schematic view in section according to a vertical plane passing through axis III-III of the preceding embodiment, the battery being in the course of installation;

FIG. 4 shows a schematic view in section of the preceding embodiment, the battery being mounted on the receiving element and the removal maneuver beginning; and FIG. 5 shows in more detail the fixation means of the embodiment shown in the preceding figures.

DETAILED DESCRIPTION

FIG. 1 shows a motor vehicle provided with a structure or chassis 1, on which there is fixed a receiving element 2.

Structure 1 is provided with two rails 11 extending longitudinally along the vehicle and two or more crossbeams (not visible) extending across the vehicle. Each rail 11 has a front portion 13, situated at the hood, a middle portion 15, situated underneath the passenger compartment and a rear portion 17, situated underneath the trunk. In the embodiment shown, receiving element 2 is mounted on structure 1 at rear portion 17 thereof. This position is not limitative with respect to the present invention. In fact, receiving element 2 may be mounted on any portion of structure 1, because of its installation and removal which are achieved by a vertical movement (along the direction Z, shown in FIG. 1), which takes place between the ground S, on which the vehicle wheels rest, and structure 1. Underneath receiving element 2, therefore, the structure has an opening (not shown), via which battery 3 may be installed and removed. In FIG. 1, battery 3, set down on the ground S, is represented by dashed lines.

In the case of the present invention, battery 3 is a unit that supplies energy to the motor to make it run for a limited duration. Especially because of its size and weight, battery 3 cannot be considered equivalent to the electric battery that is present in all motor vehicles for the purpose of starting them and for supplying the electrical systems of the vehicle, and that is recharged during travel of the vehicle. Receiving element 2 and battery 3 will be described in greater detail with reference to the following figures.

Referring to FIGS. 1 and 2, receiving element 2 is provided with two lateral supports 22, each mounted on a rail 11 of structure 1. Each lateral support 22 is provided with a longitudinal arm 23, mounted longitudinally on rail 11, and a vertical arm 24, integral with one end of longitudinal arm 23. The two supports 22 are therefore L-shaped and are disposed one beside the other, the two vertical arms 24 facing one another. The two supports 22 are joined by a cage 25, which is mounted at the free end of vertical arms 24 and which extends above longitudinal arms 23. This cage 25 and the supports 22 define a receiving element 2 for battery 3, thus forming a housing for battery 3.

As shown in FIGS. 1 and 2, battery 3 has two opposite vertical surfaces 31 or vertical walls. When battery 3 is mounted in receiving element 2, the upper face of battery 3 is disposed close to cage 25. A portion of battery 3 extends below receiving element 2. Receiving element 2 is provided with fixation means which include four bolt-forming fingers 41, mounted in pairs facing one another on longitudinal arms 23, and means 5 for interlocking these fixation means. Fixation fingers 41 extend transversely relative to receiving element 2, in a direction perpendicular to longitudinal arms 23 and in a plane perpendicular to vertical arms 24. Interlocking means 5 are provided with four drive elements 51, joined in pairs to fingers 41, which are disposed facing one another, each on a vertical face 31 of battery 3. These drive elements 51 are coupled to a rotary interlocking element 52, which will be described in more detail later. One end of each drive element 51 is connected to a finger 41, while the other end is connected to interlocking element 52. This interlocking element 52 is mounted to move by rotation around a horizontal axis X. The rotation of interlocking element 52 around axis X simultaneously pulls the two drive elements 51 connected thereto in opposite directions. The aforesaid rotation of interlocking element 52 therefore causes the ends of drive elements 51, which are connected to this interlocking element 52, to approach one another.

As shown in FIGS. 2 to 4, battery 3 has four vertical grooves 33 arranged in pairs on opposite vertical faces 31. Each of these vertical grooves 33 intersects a recess 35 transverse relative to battery 3 and substantially perpendicular to groove 33. All recesses 35 are situated at the same height along vertical grooves 33.

As shown in FIG. 3, during installation of battery 3 in receiving element 2 (for simplification, structure 1 has not been shown), battery 3 is installed on a table or platform 7 of raise-and-lower type, or in other words a table that can move by vertical translation in the Z direction (see FIG. 1). A simple table equipped with a scissors mechanism for raising and lowering it may suffice. Vertical faces 31 are disposed parallel to longitudinal arms 23 of supports 22. Fingers 41, with which each of longitudinal arms 23 is equipped, are disposed face-to-face, and have free ends spaced apart by a given distance d1 (see FIG. 4), measured in the direction transverse relative to the vehicle (or in other words in the direction perpendicular to longitudinal arms 23 of supports 22). Table 7 is disposed underneath the vehicle then raised toward structure 1, in the direction of receiving element 2. The free ends of fingers 41 disposed face-to face are moved farther apart from one another, because of the fact of their contact with the surface of vertical faces 31. When battery 3 is raised to a height above the ground S such that fingers 41 reach recesses 35, fingers 41 penetrate into the latter. The distance separating the free ends of fingers 41 is then equal to d1, as already stated. As shown in FIG. 4, battery 3 is therefore suspended by fingers 41, which bear on the upper face of recesses 35, as described in more detail in reference to FIG. 5.

FIG. 5 shows fixation means 4 and interlocking means 5 in more detail. In FIG. 5, the fixation means are in an intermediate position. Fingers 41 have a chamfered free end. Thus, in section along axis III-III, the upper longitudinal edge of fingers 41 is longer than the lower longitudinal edge. Each finger 41 is mounted in a housing 27 made in a longitudinal arm 23 of a support 22. This housing 27 extends transversely relative to longitudinal arm 23 and has an aperture disposed on the internal face of longitudinal arm 23 (or in other words on the face of longitudinal arm 23 that faces the other longitudinal arm 23). A restoring spring 45 is disposed longitudinally in the bottom of housing 27 so as to push finger 41 out of housing 27, toward the other support 22 disposed facing the one under consideration. Finger 41 has a longitudinal slot 47 disposed close to its end housed in housing 27 and is provided with a transverse stop 43 situated between the free end of finger 41 and the aforesaid longitudinal slot 47. Slot 47 and stop 43 are disposed in housing 27. A shaft 53, transverse relative to drive element 51, passes through slot 47. This shaft 53 is integral with drive element 51. In FIG. 5, it is seen that vertical groove 33 extends above recess 35. In fixation position, the free end of finger 41 is housed in recess 35. Battery 3 is supported by fingers 41, which are braced against upper horizontal face 351 of recess 35. The free end of finger 41 is spaced apart from the vertical bottom of recess 35. In the fixation position, shaft 53 is disposed at the end of slot 47 that is closest to the outlet of housing 27. By turning interlocking element 52, the operator simultaneously pulls on the two drive elements 51. Each of these two drive elements 51 is joined to a finger 41 situated on a different support 22. These two fingers 41 are mounted facing one another, each on a support 22. The rotation of interlocking element 52 around axis X pulls drive element 51 toward the opposite support 22. Since shaft 53 is integral with drive element 51 and is stopped against the end of slot 47 closest to the aperture of housing 27, the displacement of drive element 51 causes displacement of finger 41 toward the bottom of recess 35. When spring 45 is relaxed and stop 43 comes into contact with the vertical wall of longitudinal arm 22, around the aperture of housing 27, finger 41 is in interlocked position. Interlocking element 52 is blocked because of the opposing forces exerted thereon by drive elements 51. Battery 3 is therefore completely blocked in position. Since springs 45 are no longer loaded, fingers 41 remain in position and, consequently, battery 3 is not subject to the risk of falling, even in case of bumps or jolts. Furthermore, since the length of finger 41 inserted in recess 35 and braced against upper horizontal face 351 thereof is greater than in the fixation position, battery 3 is held more securely in interlocked position. In interlocked position, the distance between the free ends of fingers 41 is shorter than d1.

The operation of the device of the invention will now be explained with reference to FIGS. 1 to 5.

The installation of battery 3 will now be described with reference to FIG. 3. As explained in the foregoing, battery 3 is placed on a table 7 disposed underneath receiving element 2. Table 7 is raised manually or automatically. Upon contact with vertical walls 31, fingers 41 disposed face-to-face move farther away from one another, in the direction transverse relative to the vehicle. At recesses 35, springs 45, which continuously exert a restoring force on spaced-apart fingers 41, push fingers 41 toward the vertical bottom of these recesses 35, thus holding and blocking battery 3.

The removal of battery 3 will now be described with reference to the foregoing figures. Battery 3 is mounted in receiving element 2 and the fixation means are in their interlocked position. In a first step, the operator unblocks the fixation means. To do so, he turns interlocking element 52 so as to move the ends of drive elements 51 that are connected to this interlocking element 52 farther apart from one another. Each drive element 51 moves back toward support 22 and causes shaft 53 to be displaced in slot 47. When shaft 53 becomes stopped against the end of slot 47 that is disposed closest to the bottom of housing 27, shaft 53 pushes finger 41 back toward the bottom of housing 27. Finger 41 moves back in recess 35, toward the aperture thereof, situated at vertical face 31. Spring 45 continues to exert a restoring force that pushes finger 41 toward recess 35 and, because of this, battery 3 is always suspended on fingers 41.

As shown in FIG. 3, a table or platform 7 provided with vertical rods 71 (see FIG. 4) is then disposed underneath receiving element 2. By raising table 7 or by lowering the vehicle, vertical rods 71 are made to penetrate into vertical grooves 33. When rods 71 become stopped against the chamfered ends of fingers 41, as shown in FIG. 5, fingers 41 are pushed toward support 22 by rods 71, which continue their upward movement, driven by table 7. Each of the fingers 41 is therefore pushed into its housing 27; spring 45 is now maintained compressed by finger 41, itself pushed by rod 71. Rod 71 penetrates vertically as far as the bottom of groove 33, beyond recess 35. When it becomes stopped against the bottom of groove 33, battery 3 rests on table 7 and the vertical upward movement of the latter is stopped. Table 7 is lowered; battery 3 is then subjected to its own weight and remains on table 7. Vertical rods 71 prevent fingers 41 from returning to their fixation position by pushing them toward housing 27 and blocking the entry to recesses 35. As long as table 7 is being lowered, fingers 41 remain in contact with vertical rods 71, which maintain them in installation position, spaced apart from one another in the direction transverse relative to the vehicle, and pushed toward their housing 27. When battery 3 is completely disposed underneath structure 1, fingers 41 return to fixation position. The battery is removed and may be exchanged.

The aforesaid removal and installation maneuvers may be easily automated, thus making replacement of battery 3 easy and quick. The vehicle may therefore travel long distances by replacing its battery instead of filling up with fuel, as is the case for a vehicle with an internal combustion engine.

The invention claimed is:

1. A motor vehicle comprising:
a structure that has an underside and that supports a motor supplied by a removable power supply battery, the structure including an element for receiving the battery and including means for fixing the battery on the receiving element, the battery being capable of being installed in or removed from the receiving element by a vertical movement,
wherein the structure, the receiving element, and the means for fixing are configured to permit installation of the battery in the receiving element from the underside of the structure, by an upward movement in a direction of the structure, and to permit removal of the battery underneath the structure by a downward movement in a direction away from the structure,
wherein the battery includes a box including two opposite vertical surfaces, in each of which there is made at least one recess having an upper bracing surface,
wherein the means for fixing includes at least two bolt-forming fingers, which have free ends and which are movable between an installation position, in which the free ends are spaced apart from one another or are configured to be braced against the vertical surfaces of the box, and a fixation position, in which the free ends are close to one another and are configured to be braced against the upper bracing surface of each of the recesses, so as to suspend the box between the fingers, and
wherein the box includes on each of the vertical surfaces a substantially vertical guide groove that intersects the recess.

2. A motor vehicle, comprising:
a structure that has an underside and that supports a motor supplied by a removable power supply battery, the structure including an element for receiving the battery and including means for fixing the battery on the receiving element, the battery being capable of being installed in or removed from the receiving element by a vertical movement; and
means for interlocking the means for fixing
wherein the structure, the receiving element, and the means for fixing are configured to permit installation of the battery in the receiving element from the underside of the structure, by an upward movement in a direction of the structure, and to permit removal of the battery underneath the structure by a downward movement in a direction away from the structure, and
wherein the means for interlocking includes at least one drive element, integral with one of the fingers, and an interlocking element, which pulls on the drive element to maintain the finger inserted in the recess.

3. A motor vehicle according to claim 1, wherein the bolt-forming fingers are mounted on the receiving element via restoring means, which exert a restoring force on each of the fingers to maintain the fingers in the fixation position.

4. A device for installing and removing a removable battery on a receiving element with which the structure of a vehicle according to claim 1 is equipped,
the device including a horizontal platform capable of being disposed underneath the structure and means for unblocking the means for fixing, so that the means for fixing can be moved from the fixation position to the installation position by a vertical upward displacement of the platform and/or of the unblocking means toward the structure, as a result of which the battery becomes detached from the and is braced on the platform.

5. An installation and removal device according to claim 4, wherein the unblocking means includes two vertical rods mounted on the platform.

6. A removable battery system for a motor vehicle, comprising:
- a battery including vertical grooves arranged on opposite vertical surfaces and a transverse recess in each of the vertical grooves positioned perpendicular to the vertical grooves; and
- a receiving element including fingers configured to extend outwardly into the transverse recess in each of the vertical grooves to supports the battery.

7. The removable battery system of claim 6, wherein the receiving element includes springs configured to bias the fingers into the transverse recesses.

8. The removable battery system of claim 6, wherein the receiving element includes drive elements attached to opposing recess elements and to an interlocking element, the interlocking element is configured to be rotated in a first direction to pull on the drive elements to bias the fingers into the transverse recesses and configured to be rotated in a second direction, opposite to the first direction, to push on the drive elements to bias the fingers away from the transverse recesses.

\* \* \* \* \*